US008730020B2

(12) United States Patent (10) Patent No.: US 8,730,020 B2
Konet et al. (45) Date of Patent: *May 20, 2014

(54) SYSTEM AND METHOD FOR PRODUCING AN AUDIBLE ALERT FOR A VEHICLE

(75) Inventors: Heather Konet, Canton, MI (US); Tsuyoshi Kanuma, Kanagawa (JP); Manabu Sato, Farmington Hills, MI (US); Toshiyuki Tabata, Kanagawa (JP)

(73) Assignee: Nissan North America, Inc., Franklin, TN (US)

( * ) Notice: Subject to any disclaimer, the term of this patent is extended or adjusted under 35 U.S.C. 154(b) by 249 days.

This patent is subject to a terminal disclaimer.

(21) Appl. No.: 13/305,216

(22) Filed: Nov. 28, 2011

(65) Prior Publication Data

US 2012/0068836 A1 Mar. 22, 2012

Related U.S. Application Data

(63) Continuation-in-part of application No. 12/872,610, filed on Aug. 31, 2010, now Pat. No. 8,299,904.

(51) Int. Cl.
*B60Q 1/00* (2006.01)

(52) U.S. Cl.
USPC ............ 340/384.1; 340/384.3; 340/384.4; 340/425.5; 340/384.5; 340/692; 701/22; 701/45; 701/50; 701/70; 701/115; 340/466

(58) Field of Classification Search
USPC ............ 340/384.1–384.72, 425.5, 681, 692, 340/933, 441; 701/22, 45, 50, 70, 102, 36, 701/115

See application file for complete search history.

(56) References Cited

U.S. PATENT DOCUMENTS

| | | | |
|---|---|---|---|
| 5,237,617 | A | 8/1993 | Miller |
| 5,371,802 | A | 12/1994 | McDonald et al. |
| 5,517,173 | A | 5/1996 | Cha et al. |
| 5,635,903 | A | 6/1997 | Koike et al. |
| 5,734,726 | A | 3/1998 | Truchsess |
| 5,820,442 | A | 10/1998 | Helder |
| 5,835,605 | A | 11/1998 | Kunimoto |
| 6,275,590 | B1 | 8/2001 | Prus |
| 6,356,185 | B1 | 3/2002 | Plugge et al. |
| 6,725,150 | B1 | 4/2004 | Glandian |
| 6,859,539 | B1 | 2/2005 | Maeda |

(Continued)

FOREIGN PATENT DOCUMENTS

| | | | |
|---|---|---|---|
| DE | 3420463 | A1 | 12/1985 |
| DE | 4326639 | A1 | 2/1995 |
| DE | 19701801 | A1 | 7/1998 |
| EP | 1524649 | A1 | 4/2005 |

(Continued)

*Primary Examiner* — Benjamin C Lee
*Assistant Examiner* — Chico A Foxx
(74) *Attorney, Agent, or Firm* — Global IP Counselors, LLP (57) ABSTRACT

A method for controlling a vehicle to emanate an audible alert. The method includes determining when the vehicle is operating, and controlling a speaker system in the vehicle to emanate the audible alert outside of the vehicle for a period of time when the vehicle is operating. The audible alert has a sound profile that includes a simultaneous emanation of a first audible frequency component at a first sound pressure level and a second audible frequency component at a second sound pressure level, with the first and second sound pressure levels being greater than a sound pressure level of the sound profile at all other frequencies. The method further includes modulating the first sound pressure level of the first audible frequency component.

20 Claims, 6 Drawing Sheets

(56) References Cited

U.S. PATENT DOCUMENTS

| | | |
|---|---|---|
| 7,088,829 B1 | 8/2006 | Schick et al. |
| 7,203,321 B1 | 4/2007 | Freymann et al. |
| 7,253,746 B2 | 8/2007 | Maekawa et al. |
| 7,501,934 B2 | 3/2009 | Tischer |
| 8,299,904 B2 * | 10/2012 | Konet et al. ............... 340/384.1 |
| 2005/0113168 A1 | 5/2005 | Maeda |
| 2008/0094254 A1 | 4/2008 | Hill |
| 2009/0066499 A1 | 3/2009 | Bai et al. |
| 2011/0133954 A1 | 6/2011 | Ooshima et al. |
| 2011/0152729 A1 | 6/2011 | Ooshima et al. |
| 2011/0241868 A1 | 10/2011 | Iwamoto |

FOREIGN PATENT DOCUMENTS

| | | |
|---|---|---|
| EP | 1923865 A1 | 5/2008 |
| GB | 2261103 A | 5/1993 |
| GB | 2354872 A | 4/2001 |
| GB | 2447063 A | 9/2008 |
| JP | 04-152395 A | 5/1992 |
| JP | 06-289887 A | 10/1994 |
| JP | 11-184487 A | 7/1999 |
| JP | 11-249672 A | 9/1999 |
| WO | WO-90/13109 A1 | 11/1990 |
| WO | WO-00/12354 A1 | 3/2000 |
| WO | WO-2006/086832 A1 | 8/2006 |

* cited by examiner

SYSTEM AND METHOD FOR PRODUCING AN AUDIBLE ALERT FOR A VEHICLE

CROSS-REFERENCE TO RELATED APPLICATION

This application is a continuation-in-part of U.S. patent application Ser. No. 12/872,610, filed on Aug. 31, 2011, now U.S. Pat. No. 8,299,904, the entire contents of which are hereby incorporated herein by reference.

BACKGROUND

1. Field of the Invention

The present invention generally relates to a system and method for producing an audible alert for a vehicle. More specifically, the present invention relates to a system and method for emanating from a vehicle an audible alert having a sound profile that is readily detectable by pedestrians.

2. Background Information

Electric and hybrid vehicles are becoming increasingly popular for reasons such as rising fuel costs and environmental concerns. A secondary advantage of the shift toward widespread use of electric vehicles is the reduction of ambient noise which is emanated by an internal combustion engine (ICE) used in most vehicles today. With 100% electric power running the vehicle, generally only tire noise and some slight electric motor noise is generated during operation of fully electric vehicles. Although this greatly reduces noise pollution, this lack of noise can make it difficult for pedestrians to detect the presence of a vehicle. That is, pedestrians are highly reliant on ICE noise to detect the presence of vehicles, especially when the pedestrian is hearing or visually impaired.

One attempted solution to enable better pedestrian detection of the vehicle is to emit a synthetic ICE sound during operation of the vehicle, thereby enabling detection of the electric vehicle in the same way as ICE vehicles. However, ICE sound generation does not reduce noise pollution. Other attempted solutions include the use of a physical apparatus, such as a cone or wheel that drops to engage the ground to create a sound. Still other solutions use a plurality of ultrasonic fields that cross to produce an audible sound in a selected area around the vehicle. Other attempts generate sounds can include, for example, generating an unpleasant horn-like sound at an ambient noise frequency, or generating a sound having peaks at an ambient noise frequency.

SUMMARY

It has been discovered that the generation of ICE or ambient noise frequency sounds are not the most efficient way of enabling pedestrians to sense the presence of a vehicle.

In view of the state of the known technology, one aspect of the present invention provides a method for controlling a vehicle to emanate an audible alert. The method includes determining when the vehicle is operating, and controlling a speaker system in the vehicle to emanate the audible alert outside of the vehicle for a period of time when the vehicle is operating. The audible alert has a sound profile that includes a simultaneous emanation of a first audible frequency component at a first sound pressure level and a second audible frequency component at a second sound pressure level, with the first and second sound pressure levels being greater than a sound pressure level of the sound profile at all other frequencies. The method further includes modulating the first sound pressure level of the first audible frequency component.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
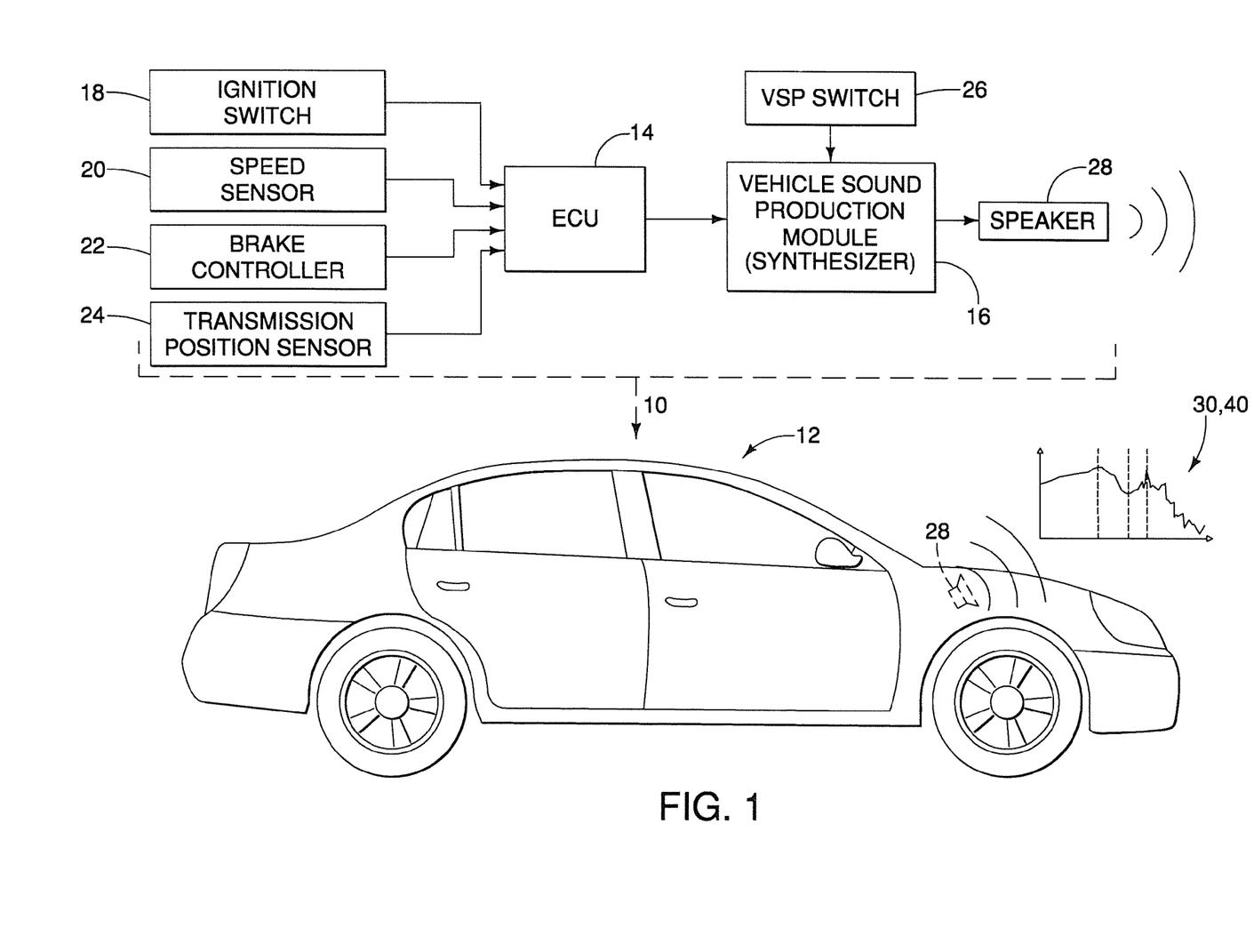
FIG. 1 is a schematic view illustrating an example of components of a system for producing an audible alert for a vehicle according to an embodiment of the present invention.

Referring initially to FIG. 1, a vehicle sound production system 10 for use in a vehicle 12 is illustrated in accordance with an embodiment of the present invention. The vehicle sound production (VSP) system 10 includes an engine control unit 14 (controller) and a vehicle sound production (VSP) module 16 that generates an audible alert as discussed in more detail below. As understood by one skilled in the art, the engine control unit 14 preferably includes a microcomputer with a control program that controls the VSP system 10 as discussed herein. The engine control unit 14 can also include other conventional components such as an input interface circuit, an output interface circuit, and storage devices such as a ROM (Read Only Memory) device and a RAM (Random Access Memory) device. The RAM and ROM store processing results and control programs that are run by the engine control unit 14. The engine control unit 14 is operatively coupled to the components of the VSP system 10, and to the components of the vehicle 12 as appropriate, in a conventional manner. It will be apparent to those skilled in the art from this disclosure that the precise structure and algorithms for the engine control unit 14 can be any combination of hardware and software that will carry out the functions of the present invention.

The engine control unit 14 receives signals from the ignition switch 18, speed sensor 20, brake controller 22 and transmission position sensor 24, and controls the VSP module 16 based on those signals as discussed in more detail below. The VSP module 16 receives on/off signals from a VSP switch 26 that enables a user to turn the VSP module 16 on and off. The VSP module 16 provides signals to at least one speaker 28 (speaker system) to cause the speaker 28 to generate an audible alert having a sound profile 30 or 40 as discussed in more detail below. Specifically, the engine control unit 14 controls the VSP module 16 to generate the sound profile 30 or 40 when the ignition switch 18 is on and the vehicle is running, the transmission position sensor 24 indicates that the vehicle 12 is in a motive gear (e.g., drive or reverse), and the speed sensor 20 indicates that the vehicle 12 is travelling forward at low speeds during which tire noise is minimal. Preferably, the engine control unit 14 controls the VSP module 16 to generate the sound profile 30 or 40 when the vehicle 12 is traveling at speeds of 25 mph or less. However, the engine control unit 14 can be configured to control the VSP module 16 to generate the sound profile 30 or 40 at any suitable vehicle speed. The sound profile 30 or 40 is a uniquely recognizable sound which, as discussed in more detail below, has a broadband sound profile and not simply pure tones. The sound profile 30 or 40 provides good detectability for pedestrians with normal hearing, such as young adults and children, good detectability for those with high frequency hearing loss, and low neighborhood community noise intrusion. That is, people over the age of 60 typically have high frequency hearing loss characterized by a significant loss in perceptibility of sounds greater than at or about 2 kHz. Hence, the sound profiles 30 and 40 should include a peak that is at least 3 dB(A) higher than the level of the ICE signal at a frequency lower than 2 kHz.

Figure 2:
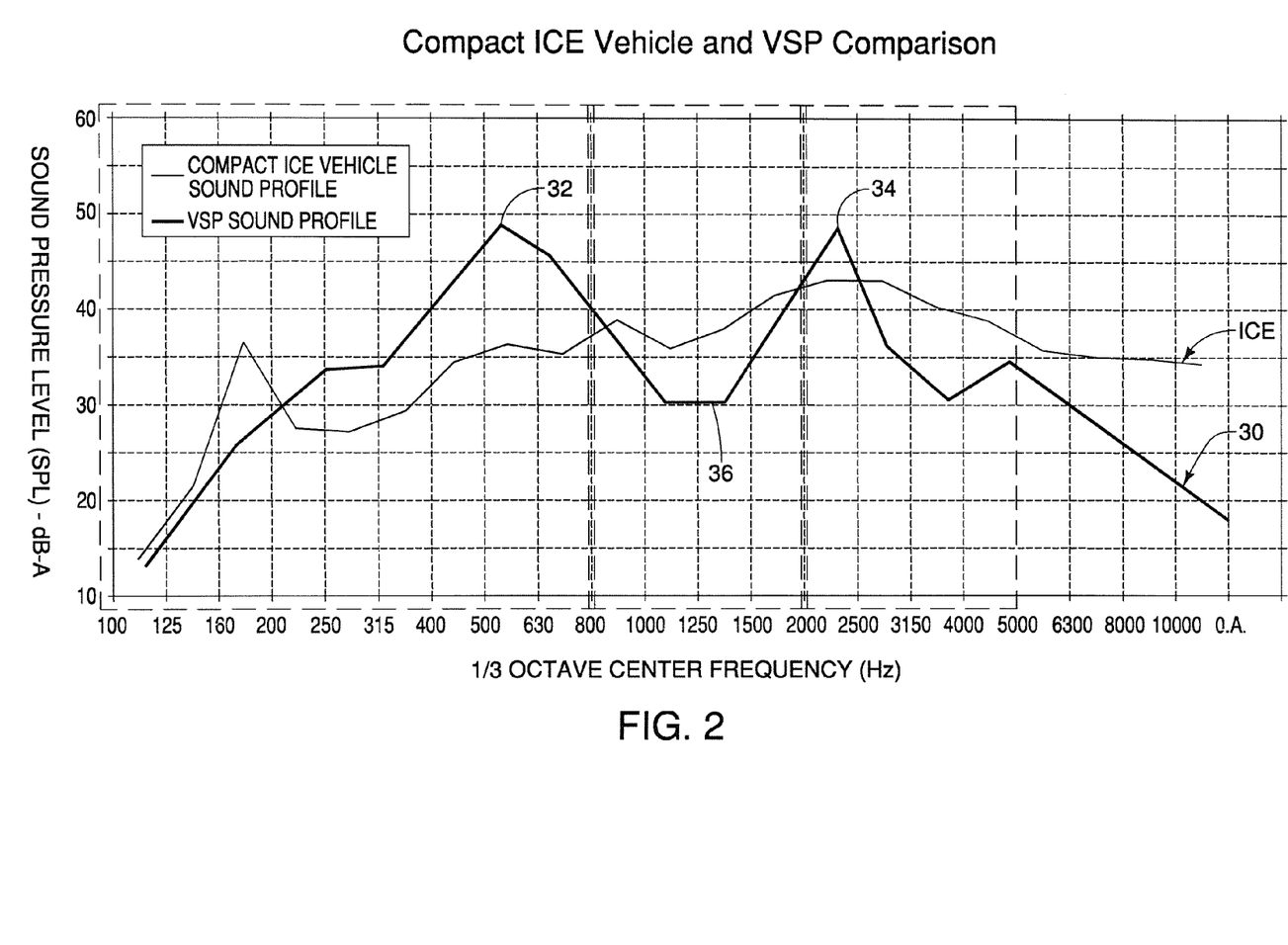
FIG. 2 is an exemplary graph in the frequency domain showing an example of the sound profile produced by the system of FIG. 1 in relation to an example of a sound profile produced by a compact ICE vehicle.
Figure 3:
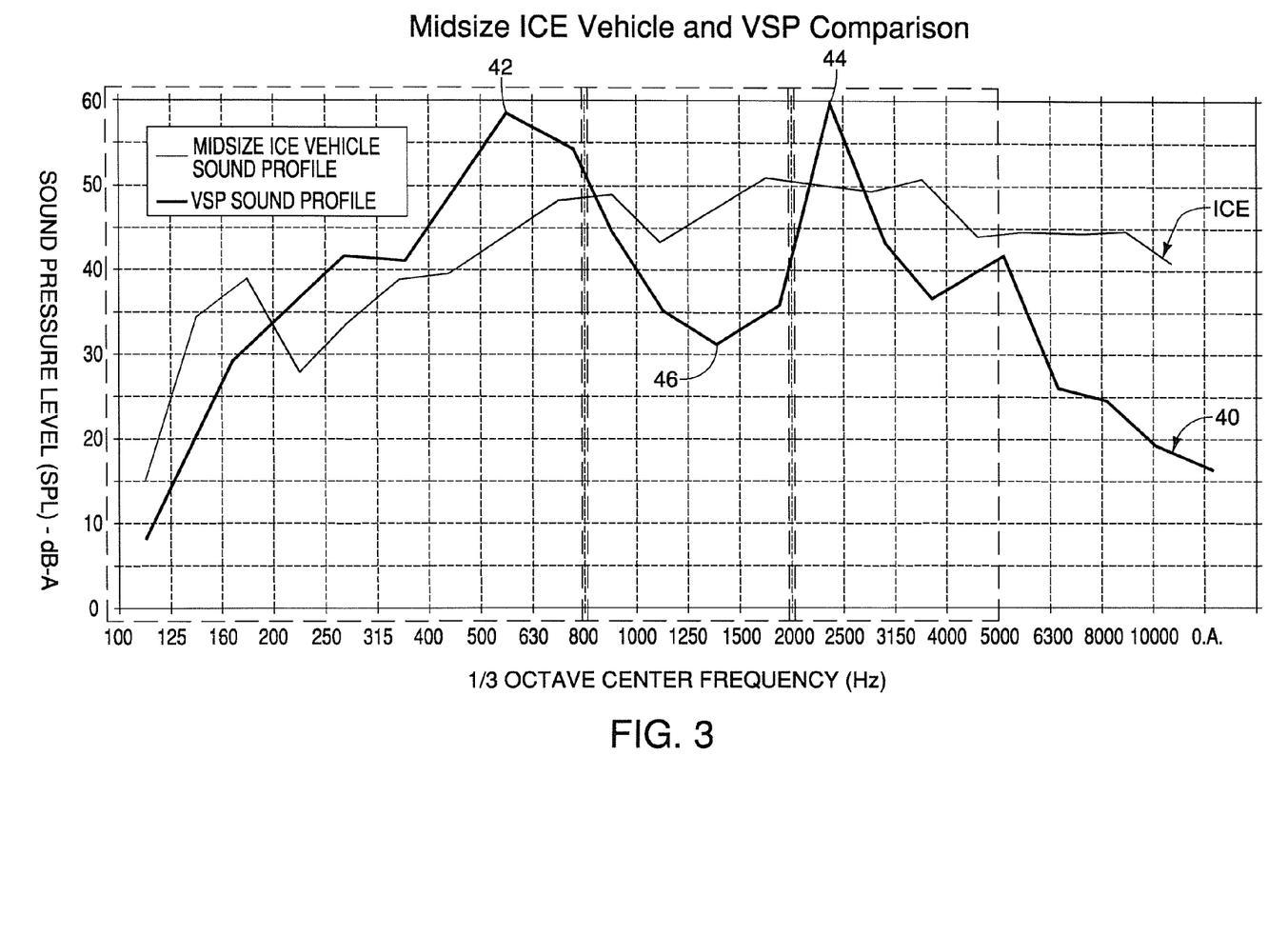
FIG. 3 is an exemplary graph in the frequency domain showing an example of the sound profile produced by the system of FIG. 1 in relation to an example of a sound profile produced by a mid-size ICE vehicle.

FIG. 2 is an exemplary graph in the frequency domain showing an example of the VSP sound profile 30 produced by the VSP system 10 of FIG. 1 in relation to an example of a sound profile produced by a compact ICE vehicle. The vertical axis represents sound pressure level in dB(A) and the horizontal axis represents the ⅓ octave center frequency. As indicated, the VSP sound profile 30 includes a low frequency component (peak) 32, a high frequency component (peak) 34, and an ambient noise component (valley) 36. The audible alert in the example shown in FIG. 2 is thus a continuous emanation of these three frequency components simultaneously. It should also be noted that the peaks 32 and 34 are the highest points in the VSP sound profile 30, and the ambient noise component 36 is a low point in the VSP sound profile 30. Furthermore, the sound pressure level of the ambient noise component 36 is preferably zero or substantially zero (e.g., less than 1 dB(A)), in which event the audible alert is a continuous emanation of the low frequency component 32 and the high frequency component 34 simultaneously. Similarly, FIG. 3 is an exemplary graph in the frequency domain showing an example of the VSP sound profile 40 produced by the VSP system 10 of FIG. 1 in relation to an example of a sound profile produced by a mid-size ICE vehicle. The vertical axis represents sound pressure level in dB(A) and the horizontal axis represents the ⅓ octave center frequency. As indicated, the VSP sound profile 40 includes a low frequency component (peak) 42, a high frequency component (peak) 44, and an ambient noise component (valley) 46. Hence, as with the example shown in FIG. 2, in this example shown in FIG. 3, the audible alert is thus a continuous emanation of these three frequency components simultaneously. It should also be noted that the peaks 42 and 44 are the highest points in the VSP sound profile 40, and the ambient noise component 46 is a low point in the VSP sound profile 40. Furthermore, the sound pressure level of the ambient noise component 46 is preferably zero or substantially zero (e.g., less than 1 dB(A)), in which event the audible alert is a continuous emanation of the low frequency component 42 and the high frequency component 44 simultaneously. Naturally, the VSP sound profiles 30 and 40 can have additional components (e.g., peaks and valleys) as long and they include at least the two peaks and one valley in the frequency ranges as discussed herein.

An example of a method for determining a VSP sound profile as shown in FIGS. 2 and 3 will now be described. For purposes of example, this discussion will refer to the VSP sound profile 30. However, the VSP sound profile 40 is determined in the same or substantially the same manner.

As can be appreciated from FIG. 2, the VSP sound profile 30 can be described by its frequency profile as compared to an ICE signal. In this case, the ICE signal is that which emanates from a compact vehicle. To make the comparison, the ICE sound is measured about 2 meters from the front grill when the compact vehicle is in a motive gear (e.g. drive) but is stationary to eliminate the impact of tire noise, and the cooling fan is off. The ICE sound profile is recorded. Then, the VSP system 10 in the same vehicle that is now being operated in an electric vehicle (EV) mode, or the VSP system 10 in a different similarly sized (compact) electric or hybrid vehicle, is operated and the VSP sound is measured about 2 meters from the front grill of the vehicle where the vehicle is running in a motive gear (e.g., drive) but stationary to eliminate tire noise, and the cooling fan is off The VSP system 10 is operated so that the VSP sound is set at the same or substantially the same overall dB(A) level as the comparable ICE vehicle, and the VSP sound profile is recorded. The VSP system 10 is then controlled to achieve the desired relationship between the VSP and ICE sound profiles.

That is, instead of the VSP sound from the electric or hybrid vehicle blending in with ICE vehicle sound, the VSP sound profile is distinct and unique to electric vehicles (or hybrid vehicles operating in the EV mode). The VSP sound profile includes three distinct characteristics, as compared to the generic ICE sound profile.

Specifically, as shown in FIG. 2, the VSP sound profile 30 should include a peak dB(A) at a high audible frequency within a range of at or about 2 kHz to at or about 5 kHz (peak 34), which is detectable by the majority of pedestrians who have normal hearing. That is, for people with normal hearing, their perceptibility of sound is strongest in this range. Also, the peak 34 should be at least 3 dB(A) higher than the level of the ICE signal at that frequency to be subjectively noticeable for a non-expert. That is, it is well known in the psychoacoustics field that the "just noticeable" difference in loudness for very low intensity sounds is about 3 dB(A). Hence, if a sound is set at around 1 dB(A) and the intensity is increased by 3 dB(A), a listener would notice the increase. As sounds get louder, the "just noticeable" difference gets smaller. Therefore, for a vehicle sound with an overall sound pressure level around 40-60 dB(A), an increase or decrease in level of 3 dB(A) is noticeable. Accordingly, if the frequency component at, for example, 2.5 kHz in one signal (the VSP sound profile) is 3 dB(A) higher than in another signal, the difference between the signals will be noticeable.

The VSP sound profile 30 should further include a peak dB(A) at a low audible frequency of less than or at about 1 kHz (peak 32), which is especially detectable by pedestrians lacking the hearing ability to detect the high frequency component (e.g., the elderly) and for detection by visually impaired people who can no longer sufficiently hear high frequencies. As discussed above, people over the age of 60 typically have high frequency hearing loss characterized by a significant loss in perceptibility of sounds greater than at or about 2 kHz. The peak 32 should be at least 3 dB(A) higher than the level of the ICE signal at that frequency. The peak 32 should be within the range between 20 Hz and 800 Hz, but is most preferred to be between 315 Hz and 800 Hz where the peak would be most likely to be perceivable by pedestrians lacking the hearing ability to detect the high frequency component.

In addition, the VSP sound profile 30 should include a valley dB(A) at the ambient noise frequency of at or about 1 kHz (valley 36). The valley 36 should be at least 3 dB(A) lower than the level of the ICE signal at that frequency, and is preferably at or near 0 dB(A). This lower dB(A) at the ambient noise frequency reduces the noise created at the typical db(A) peak of ICE engines to reduce the contribution to ambient noise, and is also more detectable by the elderly and visually impaired people than the higher frequency.

Furthermore, although specific examples are given in FIGS. 2 and 3, it is understood in the art that ICE signals are consistently broadband in character. Therefore, it is not necessary to make reference to a specific ICE signal for the embodiments of the present invention described herein.

The VSP sound profile 30 or 40 is preferably continuously emanated during operation of the vehicle. For purposes of the embodiments described herein, the terms "continuously," "continuous" and any variations or synonyms thereof as used to modify terms such as "sound profile," "sound," "signal," "emanating", "emanate" and so on refer to the outputting or emanation of a sound profile, sound or signal in a manner that is perceptible as continuous (i.e., without pauses or gaps) by a human having normal hearing. In other words, for example, "continuously emanating a sound profile" refers to the continuous emanation of a sound profile, as well as the emanation of sound profile with pauses, gaps, dead spots, etc., in a manner such that the sound profile is perceived as a continuous sound profile by a human having normal hearing even though the actual emanation is not in fact continuous. Furthermore, the sound pressure at any of the peaks or valleys in the VSP sound profiles 30 and 40, or at any of the other suitable frequencies outside of those peaks and valleys, can be modulated to enhance their audibility. That is, the sound profiles 30 and 40 can be varied over time with frequency or amplitude modulation. Preferably, the low audible frequency below 1 kHz (peak 32 of VSP sound profile 30 and peak 42 of VSP sound profile 40) can be modulated over time, or have a tempo (pulses/sec). This modulation or pulsing helps the overall signal stand out against ambient noise of similar frequency. In addition, the engine control unit 14 can control the VSP module 16 to change the pulsing or the pitch of the VSP sound profile 30 or 40 based on the speed of the vehicle 12 as measured by the speed sensor 20. For example, the engine control unit 14 can control the VSP module 16 to increase the pitch of the VSP sound profile 30 or 40 as the speed of the vehicle 12 increases, and to decrease the pitch of the VSP sound profile 30 or 40 as the speed of the vehicle 12 decreases.

Accordingly, once the VSP sound profile includes the criteria discussed above, the ECU 14 can be programmed to control the VSP module 16 of the vehicle 12 to generate this VSP sound profile at the appropriate times. Specifically, the engine control unit 14 controls the VSP module 16 to generate the sound profile 30 or 40 when the ignition switch 18 is on and the vehicle is running, the transmission position sensor 24 indicates that the vehicle 12 is in a motive gear (e.g., drive), and the speed sensor 20 indicates that the vehicle 12 is travelling forward at low speeds during which tire noise is minimal.

Hence, as discussed above, the VSP 10 controls vehicle 12 to emanate an audible alert. The engine control unit 14 (controller) determines when the vehicle is operating, and controls at least one speaker 28 (speaker system) in the vehicle 12 to emanate the audible alert outside of the vehicle for a period of time when the vehicle is operating based on stored information that is representative of an ICE noise profile. As discussed above, the audible alert has a sound profile 30 or 40 that includes a first audible frequency component 34 or 44 having a first sound pressure level that is greater than a first representative sound pressure level of the ICE noise profile at a first frequency corresponding to that of the first audible frequency component, a second audible frequency component 32 or 42 having a second sound pressure level that is greater than a second representative sound pressure level of the ICE noise profile at a second frequency corresponding to that of the second audible frequency component, and a third audible frequency component 36 or 46 having a third sound pressure level that is less than a third representative sound pressure level of the ICE noise profile at a third frequency corresponding to that of the third audible frequency component.

As can further be appreciated from the above, the third audible frequency component 36 or 46 has a frequency within an ambient noise range outside of the vehicle 12, which can be within a range between 800 Hz and 2 KHz. On the other hand, the first audible frequency component 34 or 44 is a high frequency component having a high frequency greater than frequencies of the second and third audible frequency components. The high frequency of the first audible frequency component 34 or 44 is at a frequency corresponding to an upper frequency of a normal human detectable range of frequencies, which generally is between 2 KHz and 5 KHz. Furthermore, the second audible frequency component 32 or 42 is a low frequency component having a low frequency lower than frequencies of the first and third audible frequency components. That is, the low frequency of the second audible frequency component 32 or 42 is at a frequency corresponding to a lower frequency of a normal human detectable range of frequencies, which is generally between 20 Hz and 800 Hz. In addition, the first, second and/or third sound pressure levels can be modulated to improve detection.

Figure 4:
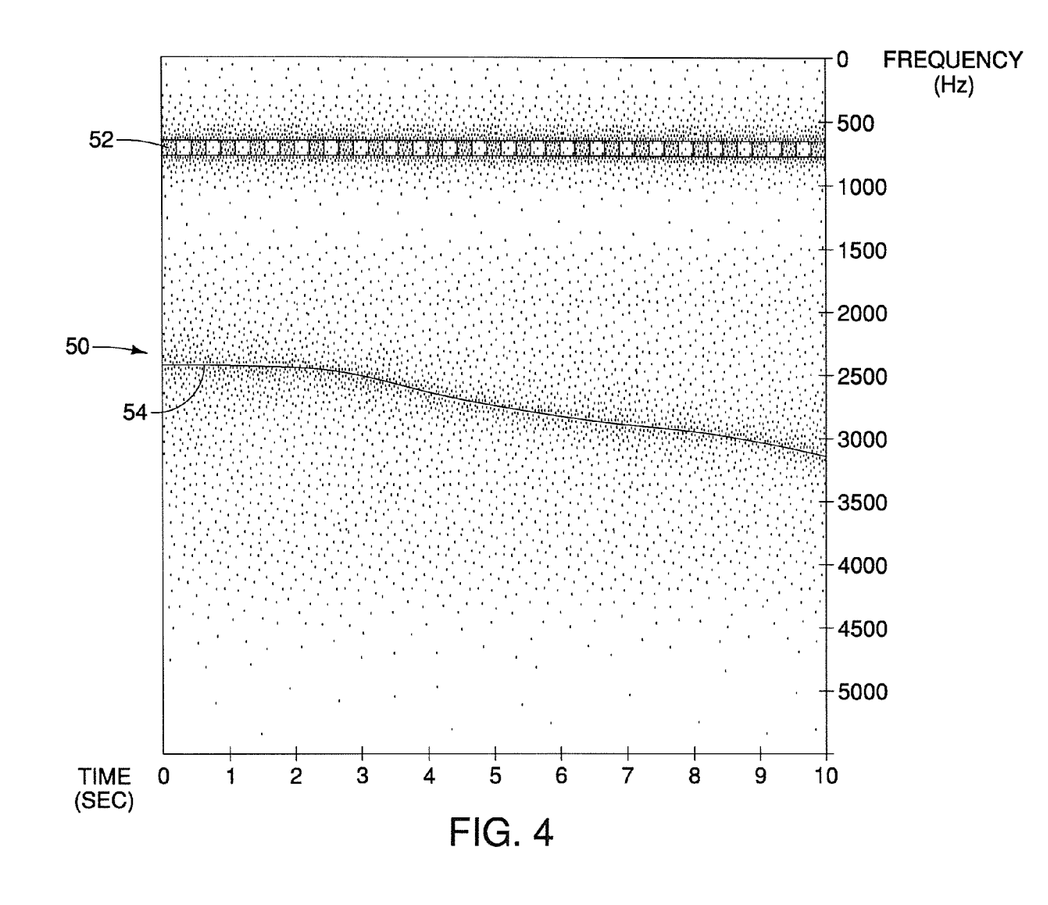
FIG. 4 is an exemplary graph in the time domain showing an example of another sound profile produced by the system of FIG. 1.
Figure 5:
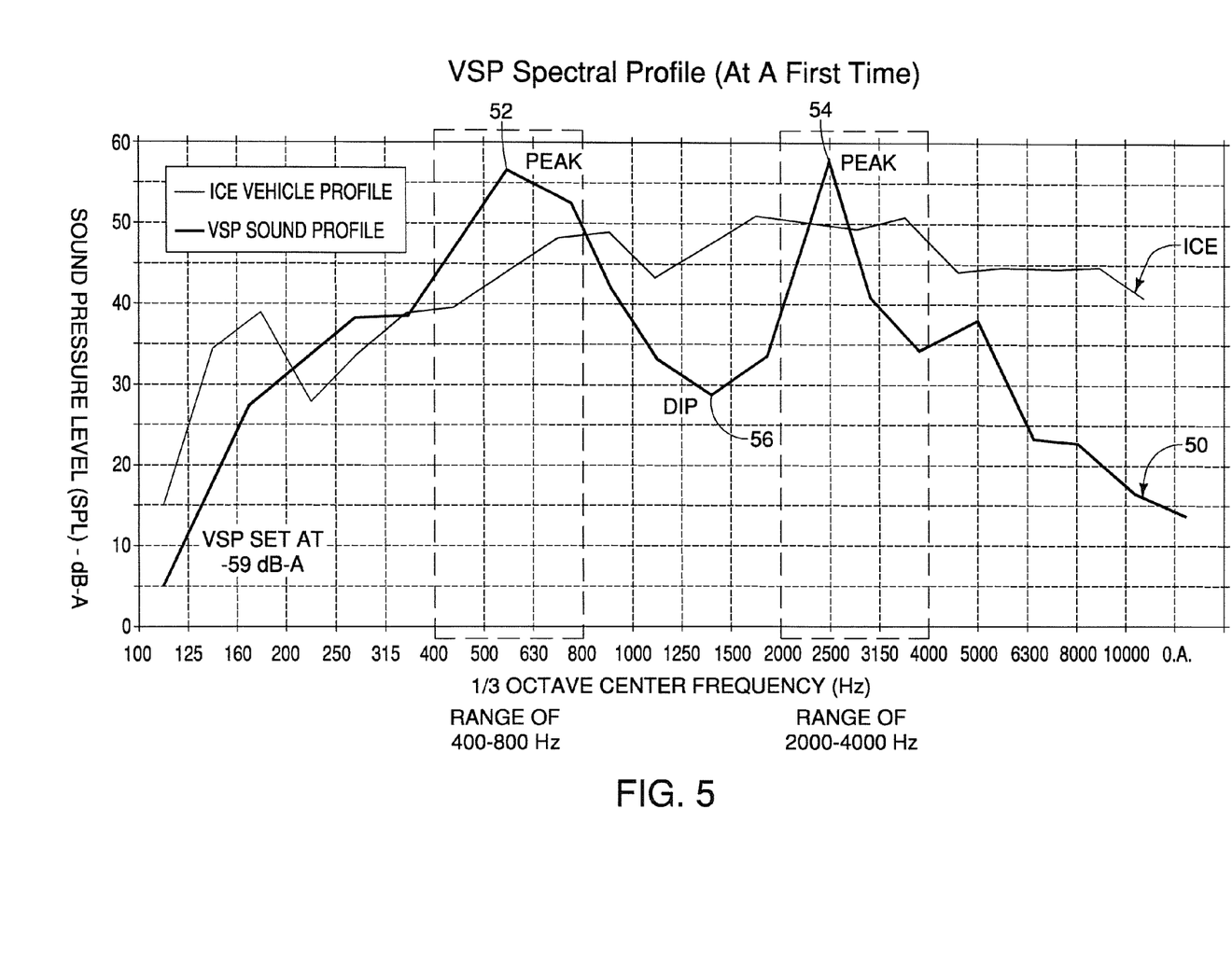
FIG. 5 is an exemplary graph in the frequency domain illustrating the sound profile shown in FIG. 4 in relation to an example of a sound profile produced by an ICE vehicle, at a time point when the low frequency peak is at its greatest sound pressure level and the high frequency peak is at a first frequency within the high frequency range.
Figure 6:
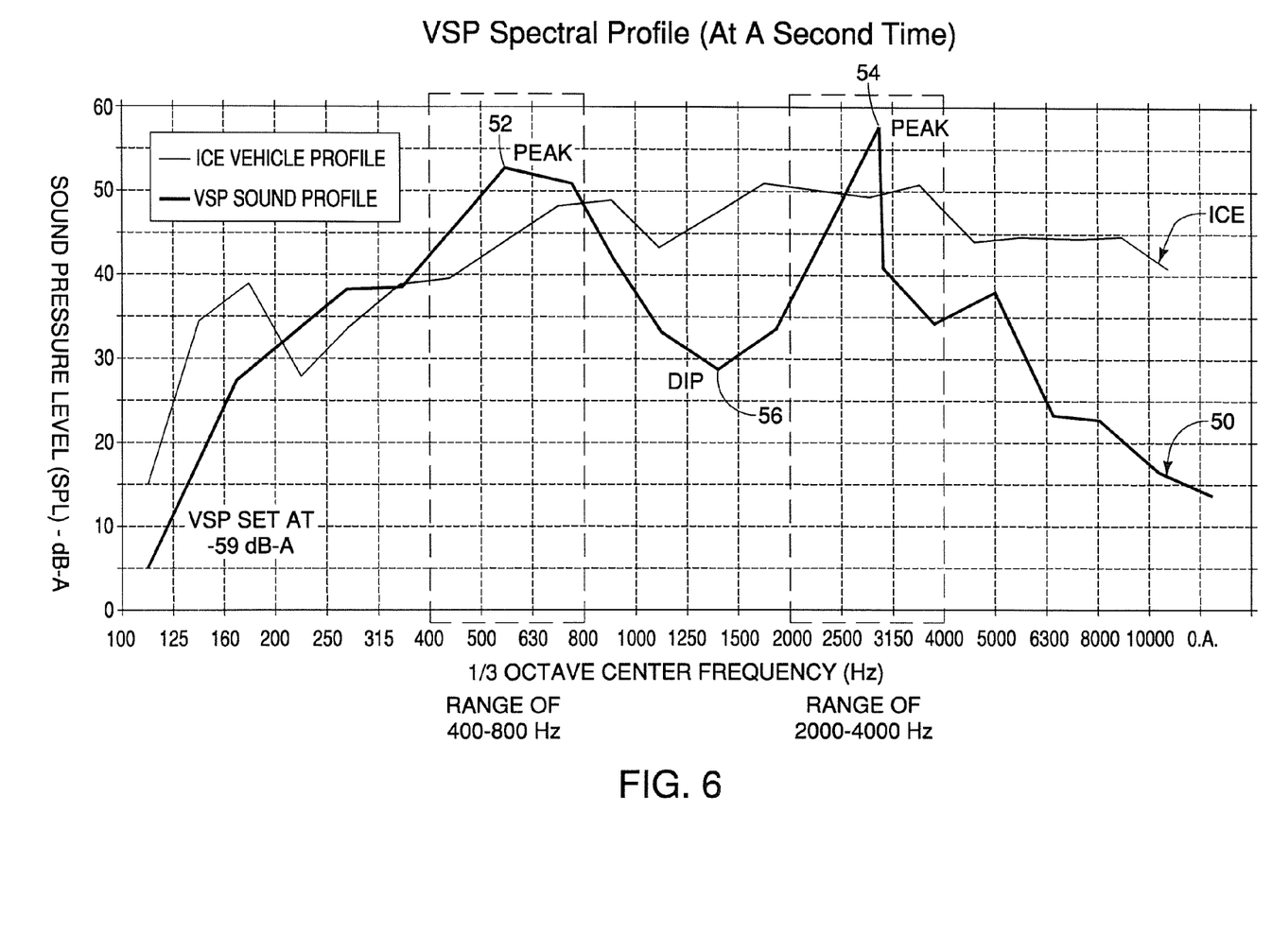
FIG. 6 is an exemplary graph in the frequency domain illustrating the sound profile shown in FIG. 4 in relation to an example of a sound profile produced by an ICE vehicle, at a time point when the low frequency peak is at its lowest sound pressure level and the high frequency peak is at a second frequency within the high frequency range that is higher than the first frequency shown in FIG. 5.

FIGS. 4 through 6 illustrate an example of another sound profile produced by the system of FIG. 1. In particular, FIG. 4 is an exemplary graph in the time domain showing an example of a sound profile 50 produced by the system of FIG. 1 showing the time domain characteristics of a low frequency component 52 and a high frequency component 54. The vertical axis represents frequency and the horizontal axis represents time. Also, the shading represents the sound pressure level. That is, the darker shading represents a higher sound pressure level and the lighter shading represents a lower sound pressure level. FIG. 5 is an exemplary graph in the frequency domain of the sound profile 50 shown in FIG. 4 in relation to an example of a sound profile produced by an ICE vehicle, at a time point when the low frequency peak 52 is at its greatest sound pressure level and the high frequency peak 54 is at a first frequency within the high frequency range. The vertical axis represents sound pressure level in dB(A) and the horizontal axis represents the ⅓ octave center frequency. FIG. 6 is an exemplary graph in the frequency domain of the sound profile 50 shown in FIG. 4 in relation to an example of a sound profile produced by an ICE vehicle, at a time point when the low frequency peak 52 is at its lowest sound pressure level and the high frequency peak 54 is at a second frequency within the high frequency range that is higher than the first frequency shown in FIG. 5. As with FIG. 5, the vertical axis represents sound pressure level in dB(A) and the horizontal axis represents the ⅓ octave center frequency. As can be understood from the relationship between FIGS. 4 through 6, the sound pressure of the low frequency peak 50 is modulated over time, which is represented by the changes in shading in FIG. 4 at a frequency around 600 Hz. Furthermore, the frequency of the high frequency peak 54 is shifted over time, as represented by the shifting of the line representing the high frequency peak 54 in FIG. 4. FIG. 4 further represents the lower sound pressure frequency ranges (e.g., the frequency ranges between approximately 100 Hz to 400 Hz, 800 Hz to 2000 Hz, and over 4000 Hz) by variations in shading in a manner consistent with the graphical representations in FIGS. 5 and 6.

An example of a method for determining a VSP sound profile as shown in FIGS. 4 to 6 will now be described. As with sound profile 30 shown in FIG. 2, the VSP sound profile 50 can be described by its frequency profile as compared to an ICE signal, such as an ICE signal is that which emanates from a compact or mid-size vehicle. To make the comparison, the ICE sound is measured in the same or a similar manner in which the ICE sound is measured as discussed above (e.g., about 2 meters from the front grill when the vehicle is in a motive gear (e.g. drive) but is stationary to eliminate the impact of tire noise, and the cooling fan is off). The ICE sound profile is recorded. Then, the VSP system 10 in the same vehicle that is now being operated in an electric vehicle (EV) mode, or the VSP system 10 in a different similarly sized (e.g., compact or mid-size) electric or hybrid vehicle, is operated and the VSP sound is measured in the same or a similar manner in which the VSP sound is measured as discussed above (e.g., about 2 meters from the front grill of the vehicle where the vehicle is running in a motive gear (e.g., drive) but stationary to eliminate tire noise, and the cooling fan is off). The VSP system 10 is operated so that the VSP sound is set at the same or substantially the same overall dB(A) level as the comparable ICE vehicle, and the VSP sound profile is recorded. The VSP system 10 is then controlled to achieve the desired relationship between the VSP and ICE sound profiles.

The VSP sound profile 50 is distinct and unique to electric vehicles (or hybrid vehicles operating in the EV mode). For example, the VSP sound profile 50 includes three distinct characteristics, as compared to the generic ICE sound profile. Specifically, as shown in FIGS. 4 through 6, the VSP sound profile 50 should include a peak dB(A) at a high audible frequency within a range of at or about 2 kHz to at or about 4 kHz (peak 54), which is detectable by the majority of pedestrians who have normal hearing as discussed above. That is, for people with normal hearing, their perceptibility of sound is strongest in this range. Also, the peak 54 should be at least 3 dB(A) higher than the level of the ICE signal at that frequency to be subjectively noticeable for a non-expert for reasons as discussed above.

The VSP sound profile 50 should further include a peak dB(A) at a low audible frequency of less than or at about 1 kHz, such as within a range between at or about 400 Hz to at or about 800 Hz (peak 52). As discussed above, these frequencies are especially detectable by pedestrians lacking the hearing ability to detect the high frequency component (e.g., the elderly) and for detection by visually impaired people who can no longer sufficiently hear high frequencies. The peak 52 should be at least 3 dB(A) higher than the level of the ICE signal at that frequency.

In addition, the VSP sound profile 50 should include a valley dB(A) at the ambient noise frequency of at or about 1 kHz, such as within a range between at or about 800 Hz to at or about 2 kHz (valley 56). The valley 56 should be at least 3 dB(A) lower than the level of the ICE signal at that frequency, and is preferably at or near 0 dB(A). This lower dB(A) at the ambient noise frequency reduces the noise created at the typical db(A) peak of ICE engines to reduce the contribution to ambient noise, and is also more detectable by the elderly and visually impaired people than the higher frequency.

In addition, although a specific example is given in FIGS. 4 through 6, it is understood in the art that ICE signals are consistently broadband in character. Therefore, as with the examples given in FIGS. 2 and 3, it is not necessary to make reference to a specific ICE signal for the embodiments of the present invention described herein.

Also, as with VSP sound profiles 30 and 40, the VSP sound profile 50 is preferably continuously emanated during operation of the vehicle. For purposes of the embodiments described herein, the terms "continuously," "continuous" and any variations or synonyms thereof as used to modify terms such as "sound profile," "sound," "signal," "emanating", "emanate" and so on refer to the outputting or emanation of a sound profile, sound or signal in a manner that is perceptible as continuous (i.e., without pauses or gaps) by a human having normal hearing. In other words, for example, "continuously emanating a sound profile" refers to the continuous emanation of a sound profile, as well as the emanation of sound profile with pauses, gaps, dead spots, etc., in a manner such that the sound profile is perceived as a continuous sound profile by a human having normal hearing even though the actual emanation is not in fact continuous.

Furthermore, the sound pressure at any of the peaks or valleys in the VSP sound profile 50, or at any of the other suitable frequencies outside of those peaks and valleys, can be modulated to enhance their audibility. That is, as with the sound profiles 30 and 40 discussed above, sound profile 50 can be varied over time with frequency or amplitude modulation. Preferably, the low audible frequency below 1 kHz (peak 52 of VSP sound profile 50) can be modulated over time, or have a tempo (pulses/sec). This modulation or pulsing helps the overall signal stand out against ambient noise of similar frequency. In addition, as with sound profiles 30 and 40, the engine control unit 14 can control the VSP module 16 to change the pulsing or the pitch of the VSP sound profile 50 based on the speed of the vehicle 12 as measured by the speed sensor 20. For example, the engine control unit 14 can control the VSP module 16 to increase the pitch of the VSP sound profile 50 as the speed of the vehicle 12 increases, and to decrease the pitch of the VSP sound profile 50 as the speed of the vehicle 12 decreases.

Accordingly, once the VSP sound profile includes the criteria discussed above, the ECU 14 can be programmed to control the VSP module 16 of the vehicle 12 to generate this VSP sound profile at the appropriate times. As with sound profiles 30 and 40, the engine control unit 14 can control the VSP module 16 to generate the sound profile 50 when the ignition switch 18 is on and the vehicle 12 is running, the transmission position sensor 24 indicates that the vehicle 12 is in a motive gear (e.g., drive), and the speed sensor 20 indicates that the vehicle 12 is travelling forward at low speeds during which tire noise is minimal.

Hence, as discussed above, the VSP 10 controls the vehicle 12 to emanate an audible alert. The engine control unit 14 (controller) determines when the vehicle is operating, and controls at least one speaker 28 (speaker system) in the vehicle 12 to emanate the audible alert outside of the vehicle 12 for a period of time when the vehicle 12 is operating based on stored information that is representative of an ICE noise profile. The audible alert has the sound profile 50 that includes a simultaneous emanation of a first audible frequency component (peak 52) at a first sound pressure level, a second audible frequency component (peak 54) at a second sound pressure level and a third audible frequency component (valley 56) having at a third sound pressure level.

As further shown, the first audible frequency component 52 is emanated at a first frequency and the second audible frequency component 54 is emanated at a second frequency that is larger than the first frequency. The third audible frequency component 56 is emanated at a third frequency that is between the first and second audible frequencies. In this example, the first audible frequency component 52 is emanated within a frequency range greater than 0 Hz and at or below 800 Hz. The second audible frequency component 54 is emanated within a frequency range between 2000 Hz and 4000 Hz inclusive. The third audible frequency component is emanated within a frequency range from greater than 800 Hz to less than 2000 Hz. Naturally, the first, second and third frequency ranges can include smaller or larger frequencies and can include smaller or greater ranges of frequencies as desired.

As can be appreciated from FIGS. 4-6, the first and second sound pressure levels 52 and 54 are greater than a sound pressure level of the sound profile 50 at all other frequencies. Furthermore, the first sound pressure level 52 is greater than a first representative sound pressure level of the ICE noise profile at the first frequency, and the second sound pressure level 54 is greater than a second representative sound pressure level of the ICE noise profile at the second frequency. Also, the third sound pressure level 56 is less than a third representative sound pressure level of the ICE noise profile at the third frequency. Furthermore, the third sound pressure level 56 can be zero or substantially zero (e.g., less than 1 dB(A)), in which event the audible alert is a continuous emanation of the low frequency component 52 and the high frequency component 54 simultaneously.

The engine control unit 14 also modulates the first sound pressure level of the first audible frequency component 52. The modulating includes emanating the first sound pressure level of the first audible frequency component 52 alternately at a first maximum sound pressure level (e.g., at or about 55 dB(A) as shown in FIG. 5) and a first minimum sound pressure level (e.g., at or about 52 dB(A) as shown in FIG. 6) at a predetermined rate. In this example, the predetermined rate is between 20 beats per minute and 20,000 beats per minute inclusive. However, the predetermined rate can be any suitable rate, and the maximum and minimum sound pressure levels can be any suitable sound pressure levels.

In addition, the engine control unit 14 can vary the second audible frequency component 54 between a spectral minimum frequency and a spectral maximum frequency. In this example, the spectral minimum frequency and the spectral maximum frequency are within 600 Hz of each other (e.g., from about 2500 Hz to about 3100 Hz). However, the spectral minimum and maximum frequencies can be any suitable values within any suitable frequency range of each other. In varying the second audible frequency component 54, the engine control unit 14 can detect a speed of the vehicle 12 and bend a pitch (frequency) of the second audible frequency component 54 based on the detected speed of the vehicle 12. In particular, the bending of the pitch increases a frequency of the second audible frequency component 54 in relation to an increase in the speed of the vehicle 12. However, the engine control unit 14 can bend the pitch of the second audible frequency component 54 in any suitable manner in relation to the speed of the vehicle 12.

As can be appreciated from the above, the sound profile 50 can be more detectable due to the manner in which the human brain processes sound. That is, the modulated low frequency sound is more recognizable in relation to other unmodulated sounds in the same frequency range. Also, since the left cortex processes temporal characteristics of sound, the modulation enables the vehicle 12 to be more detectable when approaching from the right of the pedestrian. Thus, the sound profile 50 is more distinguishable from ambient noise, and also enables a pedestrian to better ascertain the vehicle's location and movement relative to the pedestrian. Furthermore, the frequency change or pitch bending enables the pedestrian to better ascertain the speed and acceleration of the vehicle 12 based on the sound profile 50. Moreover, since the right cortex processes spectral characteristics of sound, the frequency change or pitch bending enables the vehicle 12 to be more detectable when approaching from the left of the pedestrian.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method for controlling a vehicle to emanate an audible alert, the method comprising:
   determining when the vehicle is operating; and
   controlling a speaker system in the vehicle to emanate the audible alert outside of the vehicle for a period of time when the vehicle is operating, such that the audible alert has a sound profile that includes a simultaneous emanation of a first audible frequency component at a first sound pressure level and a second audible frequency component at a second sound pressure level, with the first and second sound pressure levels being greater than a sound pressure level of the sound profile at all other frequencies; and
   modulating the first sound pressure level of the first audible frequency component.

2. The method according to claim 1, wherein
   the controlling of the speaker system to emanate the sound profile includes emanating the first audible frequency component at a first frequency and emanating the second audible frequency component at a second frequency that is larger than the first frequency.

3. The method according to claim 1, wherein
   the first audible frequency component is emanated within a frequency range greater than 0 Hz and at or below 800 Hz.

4. The method according to claim 1, wherein
   the modulating includes emanating the first sound pressure level alternately at a first maximum sound pressure level and a first minimum sound pressure level at a predetermined rate.

5. The method according to claim 4, wherein
   the predetermined rate is between 20 beats per minute and 20,000 beats per minute inclusive.

6. The method according to claim 1, further comprising
   varying the second audible frequency component between a spectral minimum frequency and a spectral maximum frequency.

7. The method according to claim 6, wherein
   the spectral minimum frequency and the spectral maximum frequency are within 600 Hz of each other.

8. The method according to claim 1, further comprising
   detecting a speed of the vehicle; and
   bending a pitch of the second audible frequency component based on the detected speed of the vehicle.

9. The method according to claim 8, wherein
   the bending of the pitch increases a frequency of the second audible frequency component in relation to an increase in the speed of the vehicle.

10. The method according to claim 1, wherein
    the second audible frequency component is emanated within a frequency range between 2000 Hz and 4000 Hz inclusive.

11. A method for controlling a vehicle to emanate an audible alert, the method comprising:
    determining when the vehicle is operating;
    controlling a speaker system in the vehicle to emanate the audible alert outside of the vehicle for a period of time when the vehicle is operating based on stored information that is representative of an internal combustion engine noise profile, such that the audible alert has a sound profile that includes a simultaneous emanation of a first audible frequency component having a first frequency emanating at a first sound pressure level that is greater than a first representative sound pressure level of the internal combustion engine noise profile at the first frequency, a second audible frequency component having a second frequency emanating at a second sound pressure level that is greater than a second representative sound pressure level of the internal combustion engine noise profile at the second frequency, and a third audible frequency component having a third frequency emanating at a third sound pressure level that is less than a third representative sound pressure level of the internal combustion engine noise profile at the third frequency; and
    modulating the first sound pressure level of the first audible frequency component.

12. The method according to claim 11, wherein
    the controlling of the speaker system to emanate the sound profile includes emanating the first audible frequency component at a first frequency and emanating the second audible frequency component at a second frequency that is larger than the first frequency.

13. The method according to claim 12, wherein
    the controlling of the speaker system to emanate the sound profile further includes emanating the third audible frequency component at a third frequency that is between the first and second audible frequencies.

14. The method according to claim 11, wherein
    the modulating includes emanating the first sound pressure level alternately at a first maximum sound pressure level and a first minimum sound pressure level at a predetermined rate.

15. The method according to claim 11, further comprising
    varying the second audible frequency component between a spectral minimum frequency and a spectral maximum frequency.

16. The method according to claim 11, further comprising
    detecting a speed of the vehicle; and
    bending a pitch of the second audible frequency component based on the detected speed of the vehicle.

17. The method according to claim 16, wherein
    the bending of the pitch increases a frequency of the second audible frequency component in relation to an increase in the speed of the vehicle.

18. A vehicle alert system comprising:
    a speaker system; and
    a controller, operable to determine when the vehicle is running, control the speaker system to emanate an audible alert outside of the vehicle for a period of time when the vehicle is operating, such that the audible alert has a sound profile that includes a simultaneous emanation of a first audible frequency component at a first sound pressure level and a second audible frequency component at a second sound pressure level, with the first and second sound pressure levels being greater than a sound pressure level of the sound profile at all other frequencies, and modulate the first sound pressure level of the first audible frequency component.

19. The vehicle alert system according to claim 18, wherein
    the controller is operable to modulate the first sound pressure level by controlling the speaker system to emanate the first sound pressure level alternately at a first maximum sound pressure level and a first minimum sound pressure level at a predetermined rate.

20. The vehicle alert system according to claim 18, wherein
    the controller is further operable to detect a speed of the vehicle, and control the speaker system to bend a pitch of the second audible frequency component based on the detected speed of the vehicle.

* * * * *